(12) United States Patent
Kamijima

(10) Patent No.: US 8,816,646 B2
(45) Date of Patent: Aug. 26, 2014

(54) SECONDARY BATTERY CONTROLLER AND METHOD FOR CONTROLLING SECONDARY BATTERY, AND ELECTRONIC APPARATUS

(75) Inventor: Junya Kamijima, Osaka (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 13/159,809

(22) Filed: Jun. 14, 2011

(65) Prior Publication Data

US 2011/0309681 A1  Dec. 22, 2011

(30) Foreign Application Priority Data

Jun. 15, 2010 (JP) ................................ 2010-136323
Jun. 13, 2011 (JP) ................................ 2011-130970

(51) Int. Cl.
*H02J 7/00* (2006.01)

(52) U.S. Cl.
CPC ....... *H02J 7/0013* (2013.01); *H02J 2007/0067* (2013.01); *H02J 7/0091* (2013.01)
USPC ............................ 320/150; 320/121; 320/124

(58) Field of Classification Search
USPC .......................................................... 320/150
See application file for complete search history.

(56) References Cited

U.S. PATENT DOCUMENTS

| | | | | |
|---|---|---|---|---|
| 5,422,558 A * | 6/1995 | Stewart | ............ | 320/120 |
| 5,640,078 A * | 6/1997 | Kou et al. | ............ | 320/124 |
| 5,738,954 A | 4/1998 | Latella et al. | | |
| 5,739,596 A * | 4/1998 | Takizawa et al. | ............ | 307/66 |
| 6,268,711 B1 * | 7/2001 | Bearfield | ............ | 320/117 |
| 6,288,521 B1 * | 9/2001 | Meador | ............ | 320/118 |
| 7,533,284 B2 * | 5/2009 | Chen | ............ | 713/340 |
| 7,863,866 B2 * | 1/2011 | Wolf | ............ | 320/150 |
| 2009/0085527 A1 * | 4/2009 | Odaohhara | ............ | 320/150 |
| 2011/0199042 A1 * | 8/2011 | Abe | ............ | 320/101 |

FOREIGN PATENT DOCUMENTS

| | | | |
|---|---|---|---|
| JP | 8-251714 | 9/1996 | |
| JP | 8-315867 | 11/1996 | |
| JP | 9-289701 | 11/1997 | |
| JP | 2005-323483 | 11/2005 | |
| JP | 2007-259645 | * 10/2007 | ............ H02J 7/14 |

* cited by examiner

*Primary Examiner* — Samuel Berhanu
*Assistant Examiner* — Jerry D Robbins
(74) *Attorney, Agent, or Firm* — Hamre, Schumann, Mueller & Larson, P.C.

(57) ABSTRACT

A secondary battery controller and a method for controlling a secondary battery that can increase the continuous operating time of an apparatus. The secondary battery controller includes a plurality of temperature detectors that detect temperatures of a plurality of secondary batteries; a switching device that connects an output of any one of the plurality of secondary batteries to a load; and a control portion that selects which secondary battery to use from the plurality of secondary batteries and controls the switching device to switch between the secondary batteries based on temperature information of each of the plurality of secondary batteries.

7 Claims, 8 Drawing Sheets

SECONDARY BATTERY CONTROLLER AND METHOD FOR CONTROLLING SECONDARY BATTERY, AND ELECTRONIC APPARATUS

BACKGROUND OF THE INVENTION

1. Field of the Invention

The present invention relates to a controller for controlling a secondary battery used as a power source of an electronic apparatus, which includes a secondary battery such as a lithium ion battery as an operating power source, a method for controlling a secondary battery during operation, and an electronic apparatus.

2. Description of Related Art

In recent years, electronic devices have become increasingly smaller and lighter, promoting widespread use of portable equipment. With the widespread use of the portable equipment (also called mobile equipment), there is a rapidly growing demand for a rechargeable secondary battery that is to be used as a power source for the portable equipment.

In order to ensure long time operation of the mobile equipment, attempts have been made to increase the battery capacity of a secondary battery. However, the battery capacity of a secondary battery is limited. Moreover, a secondary battery that is sufficient by itself to provide long time operation of the mobile equipment that requires a relatively large current (e.g., a notebook computer) is still under development. Compared to the use of one large and heavy secondary battery, the use of two or more secondary batteries, each having a predetermined size, as needed is advantageous to users because they can choose the number of secondary batteries in accordance with the expected operating conditions and operating time. For the production of the secondary battery, this is also advantageous to manufacturers in terms of design and manufacturing cost, since many secondary batteries having a predetermined size can be produced.

On the other hand, when single mobile equipment uses a plurality of secondary batteries, the secondary batteries need to be controlled as follows. First, the number of the secondary batteries actually included in the mobile equipment is confirmed. Then, if there are two or more available secondary batteries, the conditions such as the amount of current remaining in each of the available secondary batteries are determined in selecting the secondary battery to be used. If one of the secondary batteries is found to be not available, it is switched smoothly to another secondary battery.

As described above, in the case of using two or more secondary batteries, the following battery control method has been proposed (see Patent Document 1: JP 2005-323483 A). In this method, to reduce the burden of controlling the secondary batteries on the electronic apparatus, the individual secondary batteries have both a communication function and a control function, so that the connection states of the secondary batteries and the timing of switching between the secondary batteries can be transmitted, recorded, and controlled.

FIG. 8 is a block diagram of a conventional electronic apparatus using a plurality of secondary batteries, as disclosed in Patent Document 1.

The conventional electronic apparatus 102 includes a first battery pack 103 and a second battery pack 104 that are connected to a main power source 101. A load 105 is a driving circuit of the electronic apparatus 102, and is operated by switching the electric power between the external main power source 101, the first battery pack 103, and the second battery pack 104.

The first battery pack 103 and the second battery pack 104 have the same configuration and are removable from the electronic apparatus 102. The first battery pack 103 and the second battery pack 104 contain chargeable and dischargeable power sources (not shown in FIG. 8) and control circuits 111, 121 provided with state setting portions 112, 122 that are set according to the states of the battery packs, respectively.

The state setting portions 112, 122 are set according to the states of the first and second battery packs 103, 104, e.g., according to whether the first and second battery packs 103, 104 are attached to the electronic apparatus 102, or whether the first and second battery packs 103, 104 are available because the charged electric power still remains.

When the first battery pack 103 is attached to the electronic apparatus 102 in FIG. 8, an attachment detecting terminal of the first battery pack 103 detects the attachment of the first battery pack 103. Moreover, after confirming that another battery pack has not been attached yet, the state setting portion 112 of the first battery pack 103 is set to an operating state. The control circuit 111 of the first battery pack 103 outputs a presence indication signal through a presence indication line 131. This makes it possible to recognize that the first battery pack 103 has been attached and is being operated at the time another battery pack (i.e., the second battery pack 104) is connected to the electronic apparatus 102. Then, the first battery pack 103 supplies electric power to the load 105.

Subsequently, when the second battery pack 104 is attached to the electronic apparatus 102, the state setting portion 122 of the second battery pack 104 is set to a non-operating state based on the presence indication signal from the first battery pack 103. Thus, the control circuit 121 of the second battery pack 104 does not allow the second battery pack 104 to supply electric power.

Thereafter, when the first battery pack 103 is discharged and becomes unavailable, the control circuit 111 of the first battery pack 103 erases the presence indication signal in the state setting portion 112. The control circuit 121 of the second battery pack 104 detects that the presence indication signal of the first battery pack 103 is not input from the presence indication line 131, and the state setting portion 122 of the second battery pack 104 is set to an operating state. Consequently, the second battery pack 104 starts supplying electric power.

As described above, the first and second battery packs 103, 104 detect the presence indication signal from each other to know whether another battery pack has been attached and whether another battery pack is being operated. In this manner, the electric power can be supplied continuously from two or more battery packs. In the electronic apparatus 102 shown in FIG. 8, the charge of the battery packs also is controlled by the control circuits 111, 121 contained in the first and second battery packs 103, 104. Moreover, in the electronic apparatus 102, the states of the first and second battery packs 103, 104 are transmitted through a state information communication line 132 to a CPU 106 of the main body and then monitored.

The above method for controlling a plurality of secondary batteries in the conventional electronic apparatus uses the control circuits of the respective battery packs to control the charge and discharge of the battery packs, thereby achieving a continuous electric power supply in accordance with the attachment of the individual battery packs and an efficient charging process while the battery packs are connected to the external power source.

However, in the conventional electronic apparatus, when the electric power is supplied from the secondary batteries, the battery packs are used in the order they are attached to the electronic apparatus. Accordingly, one of the battery packs supplies electric power continuously until it is not available, and then this battery pack is switched to the other battery pack. Thus, the battery temperature is likely to rise due to the continuous use and may exceed the temperature limit depending on the operating conditions, so that the time at which predetermined electric power cannot be supplied occurs earlier. Moreover, in the conventional electronic apparatus, once the secondary battery is considered to have finished supplying electric power, it is not expected that the secondary battery will be reused. Therefore, even if the secondary battery is only subjected to a temporary reduction in output, e.g., because of the ambient temperature, and then is restored to the available state, the electric power cannot be supplied from this available secondary battery again. Thus, the total operating time of the secondary battery cannot be increased sufficiently.

SUMMARY OF THE INVENTION

To solve the above problems of the conventional secondary battery controller and method for controlling a secondary battery, it is an object of the present invention to provide a secondary battery controller and a method for controlling a secondary battery that can increase the continuous operating time of an apparatus in which a plurality of secondary batteries are switched and used, and an electronic apparatus that controls and uses a secondary battery.

A secondary battery controller of the present invention includes the following; a plurality of temperature detectors that detect temperatures of a plurality of secondary batteries having the same rating, respectively; a switching device that connects an output of any one of the plurality of secondary batteries to a load; and a control portion that selects which secondary battery to use from the plurality of secondary batteries and controls the switching device to switch between the secondary batteries based on temperature information of each of the plurality of secondary batteries obtained by the temperature detectors. The control portion connects the selected secondary battery to the load, and then switches the secondary battery connected to the load to another non-selected secondary battery in sequence when the first selected secondary battery reaches a predetermined threshold temperature, and further reconnects the first selected secondary battery to the load when the last selected secondary battery reaches the threshold temperature after all the secondary batteries have been selected.

A method for controlling a secondary battery of the present invention allows a plurality of secondary batteries having the same rating to be switched and connected to a load. The method includes the following: selecting any one of the plurality of secondary batteries as a secondary battery to be connected to the load; connecting the selected secondary battery to the load; switching the secondary battery connected to the load to another non-selected secondary battery in sequence when the first selected secondary battery reaches a predetermined threshold temperature; and reconnecting the first selected secondary battery to the load when the last selected secondary battery reaches a predetermined threshold temperature after all the secondary batteries have been selected.

An electronic apparatus of the present invention includes the secondary battery controller of the present invention.

In the secondary battery controller of the present invention, the temperatures of the individual secondary batteries are detected by the temperature detectors, and when the secondary battery connected to the load reaches the threshold temperature, it is switched to another secondary battery, which then is connected to the load in sequence. Thus, long-time continuous operation can be achieved by using a plurality of secondary batteries.

In the method for controlling a secondary battery of the present invention, when the secondary battery connected to the load reaches the threshold temperature, it is switched to another secondary battery, which then is connected to the load in sequence. Thus, long-time continuous operation can be achieved by using the secondary batteries at a temperature not more than the threshold temperature.

The secondary battery controller of the present invention includes the following: a plurality of temperature detectors that detect temperatures of a plurality of secondary batteries having the same rating, respectively; a switching device that connects an output of any one of the plurality of secondary batteries to a load; and a control portion that selects which secondary battery to use from the plurality of secondary batteries and controls the switching device to switch between the secondary batteries based on temperature information of each of the plurality of secondary batteries obtained by the temperature detectors. The control portion connects the selected secondary battery to the load, and then switches the secondary battery connected to the load to another non-selected secondary battery in sequence when the first selected secondary battery reaches a predetermined threshold temperature, and further reconnects the first selected secondary battery to the load when the last selected secondary battery reaches the threshold temperature after all the secondary batteries have been selected.

In the above secondary battery controller of the present invention, when the secondary battery reaches the predetermined threshold temperature, it is switched to another non-selected secondary battery that is to be connected to the load. After all the secondary batteries have been selected, the first selected secondary battery is used again. Therefore, even if the selected secondary battery reaches the threshold temperature, it can be expected that the battery temperature will decrease while another secondary battery is used instead. Thus, long-time continuous operation can be achieved by switching between the secondary batteries.

In the secondary battery controller, it is preferable that the control portion first selects the secondary battery that is located closer to an outer surface of an electronic apparatus, or the secondary battery whose temperature is not likely to rise during operation of the electronic apparatus, or the secondary battery that is cooled easily even after the temperature rises during operation of the electronic apparatus from the plurality of secondary batteries to be connected to the load. With this configuration, the secondary battery whose temperature is not likely to rise in relation to the battery arrangement can be used mainly. Thus, it is possible to increase the operating time of the electronic apparatus including the secondary batteries without performing load shedding so as to prevent a rise in battery temperature, and also to increase the period of time during which the electronic apparatus can be battery-operated at the full power.

Moreover, it is preferable that the secondary battery controller further includes an operating power control portion that limits operation of the load, and that when the temperatures of all the other secondary batteries are not less than a predetermined reference temperature as the first selected secondary battery reaches the threshold temperature, the control portion imposes limitations on the operation of the load so that operating power of the load is reduced gradually in accordance with the temperature of the first selected secondary battery while the first selected secondary battery remains connected to the load. With this configuration, even if the battery temperature is not decreased by switching between the secondary batteries, the first selected secondary battery can continue to be used for a long time by limiting the effect on the load.

Moreover, it is preferable that when the first selected secondary battery reaches a predetermined upper limit temperature even after the operation of the load is limited, the control portion controls the operation of the load under a minimum load. With this configuration, the longest possible operating time can be ensured without a significant effect on the secondary battery such as degradation of the battery characteristics.

Moreover, it is preferable that when the temperature of any one of the secondary batteries other than the first selected secondary battery is not more than the reference temperature while the operating mode of the load is the operation limited mode or the minimum load mode, the control portion switches the secondary battery connected to the load to the secondary battery at the temperature not more than the reference temperature, and restores the operating mode of the load to the normal mode. With this configuration, the secondary battery can be reused without imposing limitations on the load.

A secondary battery controller of the present invention includes the following; a temperature detector that detects a temperature of a secondary battery; an operating power control portion that limits operation of a load to which the secondary battery is connected; and a control portion that controls the operating power control portion based on temperature information of the secondary battery obtained by the temperature detector. When the secondary battery reaches a predetermined threshold temperature, the control portion imposes limitations on the operation of the load so that operating power of the load is reduced gradually in accordance with the temperature of the secondary battery.

With this configuration, even in the case of one secondary batters the secondary battery can continue to be used for a long time by limiting the effect on the load.

It is preferable that when the secondary battery reaches a predetermined upper limit temperature even after the operation of the load is limited, the control portion controls the operation of the load under a minimum load.

The method for controlling a secondary battery of the present invention allows a plurality of secondary batteries having the same rating to be switched and connected to a load. The method includes the following: selecting any one of the plurality of secondary batteries as a secondary battery to be connected to the load; connecting the selected secondary battery to the load; switching the secondary battery connected to the load to another non-selected secondary battery in sequence when the first selected secondary battery reaches a predetermined threshold temperature; and reconnecting the first selected secondary battery to the load when the last selected secondary battery reaches a predetermined threshold temperature after all the secondary batteries have been selected.

In the above method for controlling a secondary battery of the present invention, when the secondary battery reaches the predetermined threshold temperature, it is switched to another non-selected secondary battery that is to be connected to the load. After all the secondary batteries have been selected, the first selected secondary battery is used again. Therefore, even if the selected secondary battery reaches the threshold temperature, it can be expected that the battery temperature will decrease while another secondary battery is used instead. Thus, long-time continuous operation can be achieved by switching between the secondary batteries.

It is preferable that a control portion first selects the secondary battery that is located closer to an outer surface of an electronic apparatus, or the secondary battery whose temperature is not likely to rise during operation of the electronic apparatus, or the secondary battery that is cooled easily even after the temperature rises during operation of the electronic apparatus from the plurality of secondary batteries to be connected to the load. With this configuration, the secondary battery whose temperature is not likely to rise in relation to the battery arrangement can be used mainly. Thus, it is possible to increase the operating time of the electronic apparatus including the secondary batteries without performing load shedding so as to prevent a rise in battery temperature, and also to increase the period of time during which the electronic apparatus can be battery-operated at the full power.

Moreover, it is preferable that when temperatures of all the other secondary batteries are not less than a predetermined reference temperature as the first selected secondary battery reaches the threshold temperature, limitations are imposed on operation of the load so that operating power of the load is reduced gradually in accordance with the temperature of the first selected secondary battery while the first selected secondary battery remains connected to the load. With this configuration, even if the battery temperature does not decrease only by switching between the secondary batteries, the first selected secondary battery can continue to be used for a long time by limiting the effect on the load.

Moreover, it is preferable that when the first selected secondary battery reaches a predetermined upper limit temperature even after the operation of the load is limited, the operation of the load is controlled under a minimum load. With this configuration, a longer operating time can be ensured without a significant effect on the secondary battery such as degradation of the battery characteristics.

Moreover, it is preferable that when the temperature of any one of the secondary batteries other than the first selected secondary battery is not more than the reference temperature while the operation of the load is limited or controlled under a minimum load, the secondary battery connected to the load is switched to the secondary battery at the temperature not more than the reference temperature, and the limitations on the operation of the load are removed. With this configuration, the secondary battery can be reused without imposing limitations on the load.

A method for controlling a secondary battery of the present invention includes imposing limitations on operation of a load so that operating power of the load is reduced gradually in accordance with a temperature of a secondary battery when the secondary battery reaches a predetermined threshold temperature.

With this configuration, even in the case of one secondary battery, the secondary battery can continue to be used for a long time by limiting the effect on the load.

It is preferable that when the secondary battery reaches a predetermined upper limit temperature even after the operation of the load is limited, the operation of the load is controlled under a minimum load.

An electronic apparatus of the present invention includes a load, a plurality of secondary batteries that serve as operating power sources of the load, and any of the above secondary battery controllers of the present invention that switch between the plurality of secondary batteries. With this configuration, the electronic apparatus takes advantage of the features of the secondary battery controller of the present invention, and thus can be operated more stably by the secondary batteries for a long time.

DETAILED DESCRIPTION OF THE INVENTION

Hereinafter, embodiments of a secondary battery controller, a method for controlling a secondary battery, and an electronic apparatus including the secondary battery controller will be described with reference to the drawings.

Figure 1:
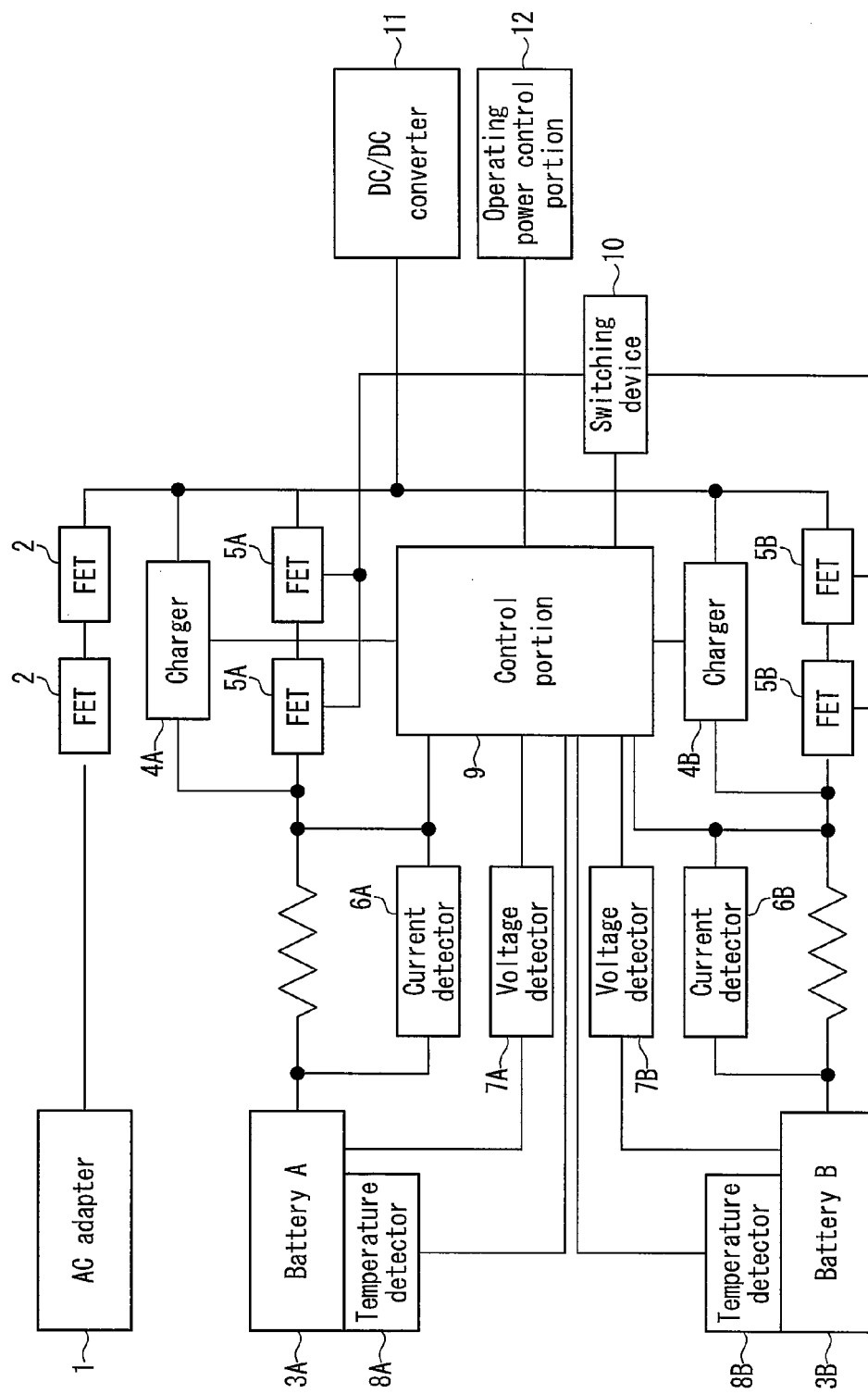
FIG. 1 is a circuit block diagram showing a configuration example of a secondary battery controller according to an embodiment.

FIG. 1 is a circuit block diagram showing a schematic configuration of a secondary battery controller that is incorporated into a notebook computer (electronic apparatus) in this embodiment. In FIG. 1 and the following figures, this embodiment uses two secondary batteries, i.e., batteries A and B having the same rating as an illustrative example.

As shown in FIG. 1, the secondary battery controller in this embodiment connects either the battery A (3A) that is a first secondary battery or the battery B (3B) that is a second secondary battery to a DC/DC converter 11 that is a load connected to a power source for driving the notebook computer. The secondary battery controller includes a first temperature detector 8A that detects the temperature of the battery A (3A), a second temperature detector 8B that detects the temperature of the battery B (3B), a switching device 10 that switches between the battery A (3A) and the battery B (3B) so that one of the batteries is connected to the DC/DC converter 11, and a control portion 9 that controls the switching operation of the switching device based on the temperature information of the battery A (3A) and the temperature information of the battery B (3B).

The battery A (3A) (the first secondary battery) and the battery B (3B) (the second secondary battery) are attachable and detachable with respect to the notebook computer and have the same rating.

The control portion 9 of the secondary battery controller incorporated into the notebook computer in this embodiment controls, e.g., not only electric power supplies from the secondary batteries, but also the charge of the battery A (3A) and the battery B (3B). Therefore, FIG. 1 shows the following; an AC adapter 1 that obtains AC power from an external commercial power source, converts the AC power to a DC voltage, and outputs the DC voltage; a charger 4A that charges the battery A (3A); a current detector 6A and a voltage detector 7A that confirm the charged state and the operating conditions of the battery A (3A); a charger 4B that charges the battery B (3B); and a current detector 6B and a voltage detector 7B that confirm the charged state and the operating conditions of the battery B (3B).

In FIG. 1, FET 2, FET 5A, and FET 5B represent switches for changing, e.g., the connections between the AC adapter 1, the battery A (3A), the battery B (3B), and the DC/DC converter 11 and the connections of the chargers 4A and 4B to the battery A (3A) and the battery B (3B).

Moreover, the notebook computer includes an operating power control portion 12 that controls switching between the operating modes of the notebook computer (i.e., the load) in accordance with the instructions from the control portion 9.

The control portion 9 is configured by the combination of a microcomputer and a logic circuit, and receives the temperature information of the battery A (3A) and the battery B (3B) from the temperature detectors 8A and 8B. Then, the control portion 9 decides whether to use electric power of the battery A (3A) or the battery B (3B) based on the predetermined control logic, and controls the switching device 10 to switch so that an output terminal of either the battery A (3A) or the battery B (3B) is connected to the DC/DC converter 11 that serves as a voltage generator for driving the notebook computer.

As will be described later, if the battery A (3A) cannot be switched to the battery B (3B), the control portion 9 gives instructions to the operating power control portion 12 to switch the operating mode of the notebook computer to a mode that consumes less electric power in accordance with the temperature state of the battery A (3A), and thus controls the operating power of the notebook computer.

The temperature detectors 8A, 8B can be a known temperature detecting means such as a thermally sensitive electrical device (e.g., a thermocouple or a thermistor). The temperature detectors 8A, 8B are located in the positions where the temperatures of the battery A (3A) and the battery B (3B) can be detected with sufficient accuracy when the batteries are attached to the notebook computer.

Both the secondary batteries, i.e., the battery A (3A) and the battery B (3B) can be a lithium ion battery of 5700 mAh/7.4 V including four charging cells. In the secondary battery controller and the method for controlling a secondary battery in this embodiment, there is no particular limitation to the type, output voltage value, capacity, etc. of the secondary battery, and the control logic of the control portion 9 can be applied to various types of secondary batteries. However, the secondary battery controller and the method for controlling a secondary battery in this embodiment are provided on the premise that the battery A (3A) and the battery B (3B) have the same rating.

As described above, the secondary battery controller is contained in the notebook computer in this embodiment, but the illustration and explanation of a circuit configuration or the like of the main body of the notebook computer will be omitted.

Next, operation of the control portion 9 of the secondary battery controller in this embodiment, and a specific example of the method for controlling a secondary batters which is indicated by the control logic of the control portion 9, will be described with reference to the drawings.
(First Stage: Battery Switching Mode)

Figure 2:
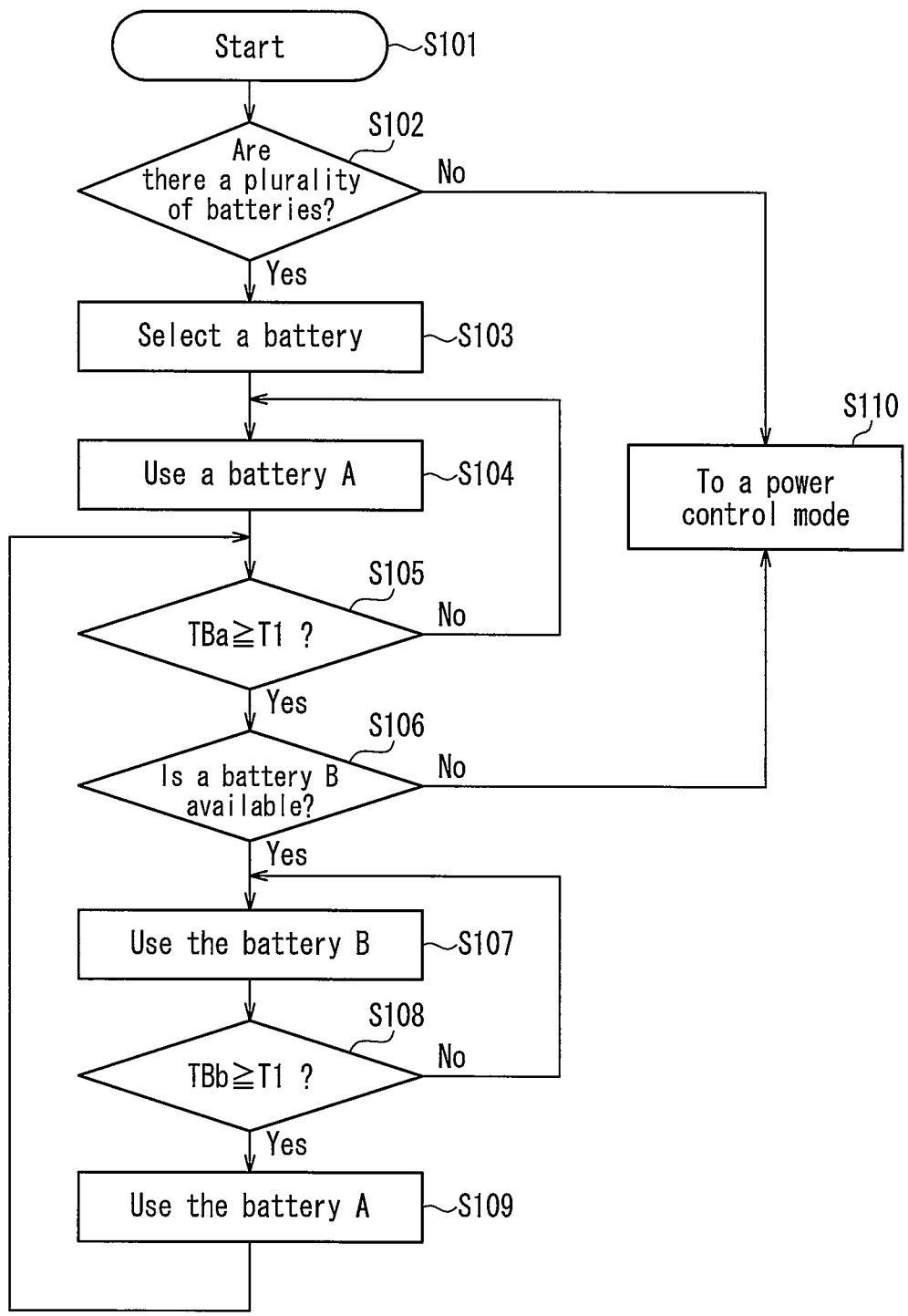
FIG. 2 is a flow chart showing an example of a control logic of a control portion in a battery switching mode of a secondary battery controller according to an embodiment.
Figure 3:
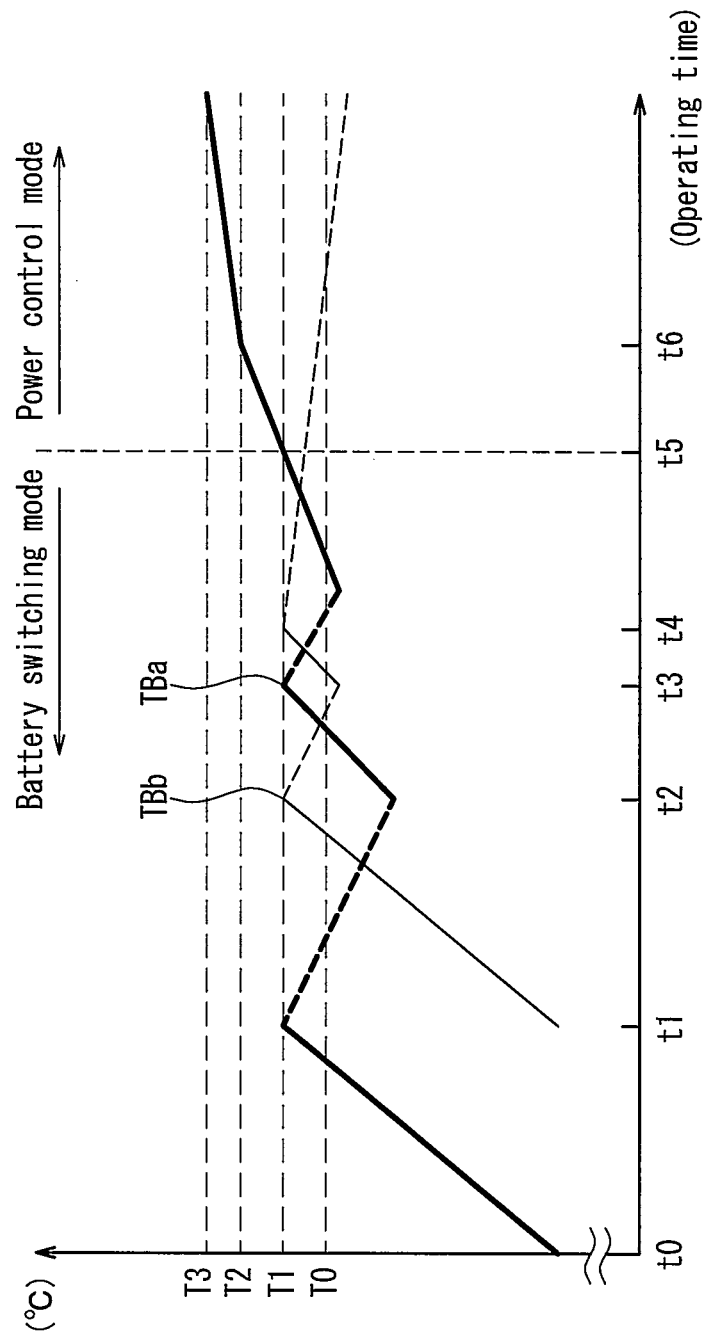
FIG. 3 is a diagram showing temperature changes of secondary batteries in a secondary battery controller according to an embodiment.

FIG. 2 is a flow chart showing, as an example of the control logic of the control portion 9 of the secondary battery controller in this embodiment, a method for switching between the battery A (3A) and the battery B (3B) to supply electric power to the load when the two secondary batteries are attached to the notebook computer. FIG. 3 is a graph showing temperature changes of the battery A (3A) and the battery B (3B) when the switching control of the secondary batteries is performed based on the flow chart in FIG. 2.

In the following description of the present specification, the control logic for the switching method that determines which of the two secondary batteries is to be used, as shown in the flow chart of FIG. 2, is referred to as a battery switching mode.

In the example of the control logic of the control portion 9 for the use of the battery power (i.e., during discharge) in FIG. 2, at the start of using the battery power (step S101), first, the control portion 9 confirms whether a plurality of batteries are attached (step S102).

As described above, the secondary battery controller in this embodiment uses the control logic for switching between the two batteries A and B shown in FIGS. 2 and 3. However, the control logic in the secondary battery controller in this embodiment is not limited to two batteries, and also can be applied to three or more batteries so that the batteries can be used by switching from one battery to another in sequence.

Moreover, in the step S102, the control portion 9 confirms whether there are a plurality of batteries that are not necessarily fully charged, but have at least a predetermined charging voltage that enables the batteries to withstand the normal operation.

As shown in FIG. 1, since the control portion 9 (control circuit) in this embodiment also controls the charge of the battery A (3A) and the battery B (3B), the voltage detectors 7A, 7B are provided to detect the voltages of the battery A (3A) and the battery B (3B), respectively. Therefore, although it is easy to detect whether the attached secondary batteries are available, when the control portion 9 does not control the charge of the secondary batteries, the information of the charged state of each of the secondary batteries preferably is input to the control portion 9.

In the step S102, if there are not a plurality of available batteries (i.e., in the case of "No"), the switching control of the batteries cannot be performed. Therefore, the control portion 9 proceeds to a step S110, and then transfers to a power control mode (as will be described later).

In the step S102, if the control portion 9 confirms that there are a plurality of batteries (i.e., in the case of "Yes"), then the control portion 9 proceeds to a step S103 and selects the battery to be used as the battery A in the subsequent control.

As will be described below, the control logic in this embodiment uses the battery A (3A) as a main battery and the battery B (3B) as a sub-battery. Therefore, the "battery A" of the control logic is selected, e.g., from the battery having a lower temperature at the time of the start of operation, the battery having a smaller number of operating cycles when the number of operating cycles is determined, and the battery having a higher remaining battery level.

If there is no difference in the characteristics and conditions between the batteries attached to the electronic apparatus, the battery A (main battery) can be either the battery located closer to the outer surface of the notebook computer (electronic apparatus) or the battery located in the vicinity of a radiation fin, a fan for heat dissipation, a cooling device, a ventilating hole, etc., where the temperature of the battery is not likely to rise or the battery is cooled quickly even after the temperature rises during operation.

In this manner, the main battery can be maintained at a relatively low temperature, and therefore desired electric power can continue to be supplied to the notebook computer (i.e., the load) for a longer time. Moreover, regardless of the operating history or remaining battery level of each of the batteries, the battery A (main battery) can be defined ahead of time based only on the attachment positions of the batteries in the notebook computer (electronic apparatus). Accordingly, the secondary battery whose temperature is not likely to rise in relation to the battery arrangement can be used mainly. Thus, it is possible to increase the operating time of the electronic apparatus including the secondary batteries without performing load shedding so as to prevent a rise in battery temperature, and also to increase the period of time during which the electronic apparatus can be battery-operated at the full power. If the conditions of all the batteries are the same, any battery can be defined as the battery A.

In a step S104, the control portion 9 controls the switching device 10 to switch so that the output terminal of the selected battery A (3A) is connected to the DC/DC converter 11. Thus, the notebook computer starts to be battery-operated.

By using the battery A (3A), as shown in FIG. 3, a temperature TBa of the battery A (3A) rises with the discharge.

The battery temperature rises due to the continuous use of the battery. If the battery temperature reaches a predetermined temperature or more, the battery power supply may be a problem, e.g., because the discharge characteristics of the battery are reduced. Moreover, a rise in battery temperature can damage the electronic circuit components placed around the battery or the case of the electronic apparatus such as a notebook computer. Therefore, when the battery is incorporated into the electronic apparatus such as a notebook computer, the upper limit of the battery temperature is defined as a standard. For example, a lithium ion battery has an upper limit standard value of 80° C.

For a small, lightweight, and portable electronic apparatus, it is assumed that a user holds the electronic apparatus by hand. In this case, if the temperature of the battery in the electronic apparatus rises, the user will feel the heat transferred through the case. In order to allow the user to use the electronic apparatus without having an uncomfortable feeling, when the case of the electronic apparatus has an upper limit temperature, the upper limit of the temperature of the battery in the electronic apparatus may have to be determined based on the upper limit temperature of the case. Hereinafter, this embodiment will describe specific limitations on the battery temperature in the case where the upper limit of the battery temperature is 52° C., since the upper limit temperature of the case of the notebook computer is set to 47° C. as an example of the temperature conditions.

As described above, in the notebook computer in this embodiment, the upper limit of the battery temperature is 52° C. Therefore, the switching control of the batteries is performed while a threshold temperature T1 in the control logic is set to 45° C., so that the battery temperature does not exceed the upper limit.

In the following step S105, the control portion 9 monitors the temperature of the battery A (3A). If the temperature TBa of the battery A (3A) detected by the temperature detector 8A is not less than the threshold temperature T1 (=45° C.) (i.e., in the case of "Yes"), then the control portion 9 proceeds to the next step S106.

In the step S106, the control portion 9 acquires the temperature information of the battery B (3B) from the temperature detector 8B, and confirms whether the temperature of the battery B (3B) is not more than a reference temperature at which the battery B (3B) is available. If the control portion 9 decides that the battery B (3B) is available (i.e., in the case of "Yes"), then the control portion 9 proceeds to a step S107. If the control portion 9 decides that the battery B (3B) is not available (i.e., in the case of "No"), then the control portion 9 proceeds to the step S110.

In this case, the reference temperature is the upper limit of the temperature of the battery B (3B) in the available state, and is lower than the threshold temperature T1 so that the battery B (3B) does not reach the threshold temperature T1 as soon as switching to the battery B (3B) has been performed. Specifically, in the control logic in this embodiment, the threshold temperature T1 is 45° C., and thus the reference temperature can be set, e.g., to 42° C.

Immediately after the start of the battery operation in accordance with the control logic in this embodiment, particularly when the battery B (3B) has not been used yet, the temperature of the battery B (3B) can hardly rise, since the battery B (3B) itself does not generate heat. However, when the battery A (3A) and the battery B (3B) are switched based on the control logic in this embodiment, the temperature of the battery B (3B) may not be sufficiently low as the battery A (3A) reaches the threshold temperature T1. If the two batteries are both found to be difficult to use, the battery A (3A), which has been selected in the step S103 for its advantages in terms of a rise in battery temperature, is used for the control in the power control mode (the step S110 and the following steps), as will be described later.

On the other hand, in the step S106, if the control portion 9 decides that the battery B (3B) is at a temperature at which the battery B (3B) is available (i.e., in the case of "Yes"), then the control portion 9 controls the switching device 10 to switch so that the output terminal of the battery B (3B) is connected to the DC/DC converter 11 (step S107). Thus, switching from the battery A (3A) to the battery B (3B) is performed.

Next, the control portion 9 monitors the output of the temperature detector 8B, and confirms whether a temperature TBb of the battery B (3B) in the available state is not less than the threshold temperature T1 (step S108).

In the step S108, if the temperature TBb of the battery B (3B) is less than the threshold temperature T1 (i.e., in the case of "No"), then the control portion 9 returns to the step S107 and continues the battery operation with the battery B (3B). If the temperature TBb of the battery B (3B) is not less than the threshold temperature T1 (i.e., in the case of "Yes"), then the control portion 9 proceeds to a step S109 and controls the switching device 10 to switch so that the output terminal of the battery A (3A) is connected to the DC/DC converter 11. Thus, switching from the battery B (3B) to the battery A (3A) is performed.

In the step S107, when the battery A (3A) is switched to the battery B (3B), the control portion 9 confirms in advance whether the battery B (3B) is in the available state. As described above, in the control logic in this embodiment, the battery that is advantageous in terms of a rise in battery temperature is first selected as the battery A (main battery) in the step S103. Therefore, when the battery B (3B) is switched to the battery A (3A) in the step S109, the state of the battery A (3A) is not confirmed in advance.

After switching to the battery A (3A), the control portion 9 returns to the step S105 and confirms whether the temperature TBa of the battery A (3A) is not less than the threshold temperature T1. Subsequently, the control portion 9 repeats the operation from the step S105 to the step S109 until the battery A (3A) cannot be switched to the battery B (3B), and then transfers to the power control mode (step S110).

When the batteries are controlled by the control logic in FIG. 2, the temperature TBa of the battery A (3A) rises from the time t0 to the time t1 and reaches the threshold temperature T1 at the time t1, as shown in FIG. 3. Then, since the control portion 9 controls switching from the battery A (3A) to the battery B (3B), the temperature TBb of the battery B (3B) rises from the time t1 to the time t2. On the other hand, the battery A (3A) is not used between the time t1 and the time t2, and thus the temperature TBa of the battery A (3A) decreases gradually.

Thereafter, the temperature TBb of the battery B (3B) reaches the threshold temperature T1 at the time t2, so that the battery B (3B) is switched back to the battery A (3A) at the time t2. Then, the battery A (3A) is switched to the battery B (3B) at the time t3 again, and further the battery B (3B) is switched to the battery A (3A) at the time t4. In the graph of FIG. 3, the solid lines indicate changes in battery temperature while the batteries are used, and the dotted lines indicate changes in battery temperature while the batteries are not used.

Thereafter, the temperature TBa of the battery A (3A) reaches the threshold temperature T1 at the time t5. However, the degree of the temperature decrease of the battery B (3B) becomes smaller due to the repeated use. Consequently, at the time t5, the temperature TBb of the battery B (3B) is not less than a reference temperature of 42° C., at which the battery B (3B) is considered available. Therefore, the control portion 9 selects "No" in the step S106 shown in FIG. 2, and then transfers to the power control mode (step S110).

(Second Stage: Power Control Mode)

Next, a power control mode will be described as the control logic of the control portion 9 in this embodiment. In the power control mode, the power of the notebook computer (i.e., the load) is limited to suppress a rise in battery temperature when one of the batteries is brought into a saturation state in which the battery temperature does not fall easily by switching to the other battery.

Figure 4:
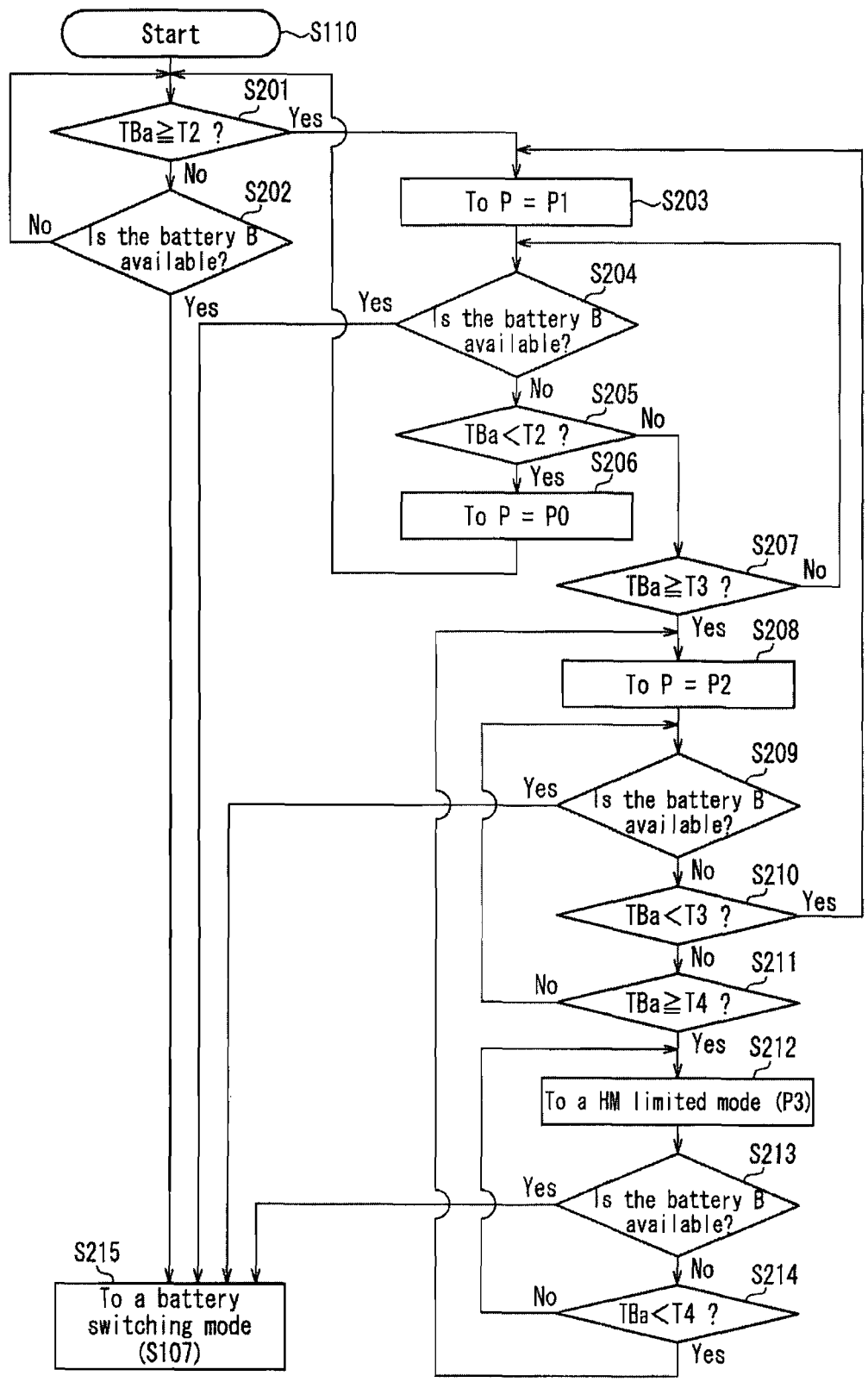
FIG. 4 is a flow chart showing an example of a control logic of a control portion in a power control mode of a secondary battery controller according to an embodiment.
Figure 5:
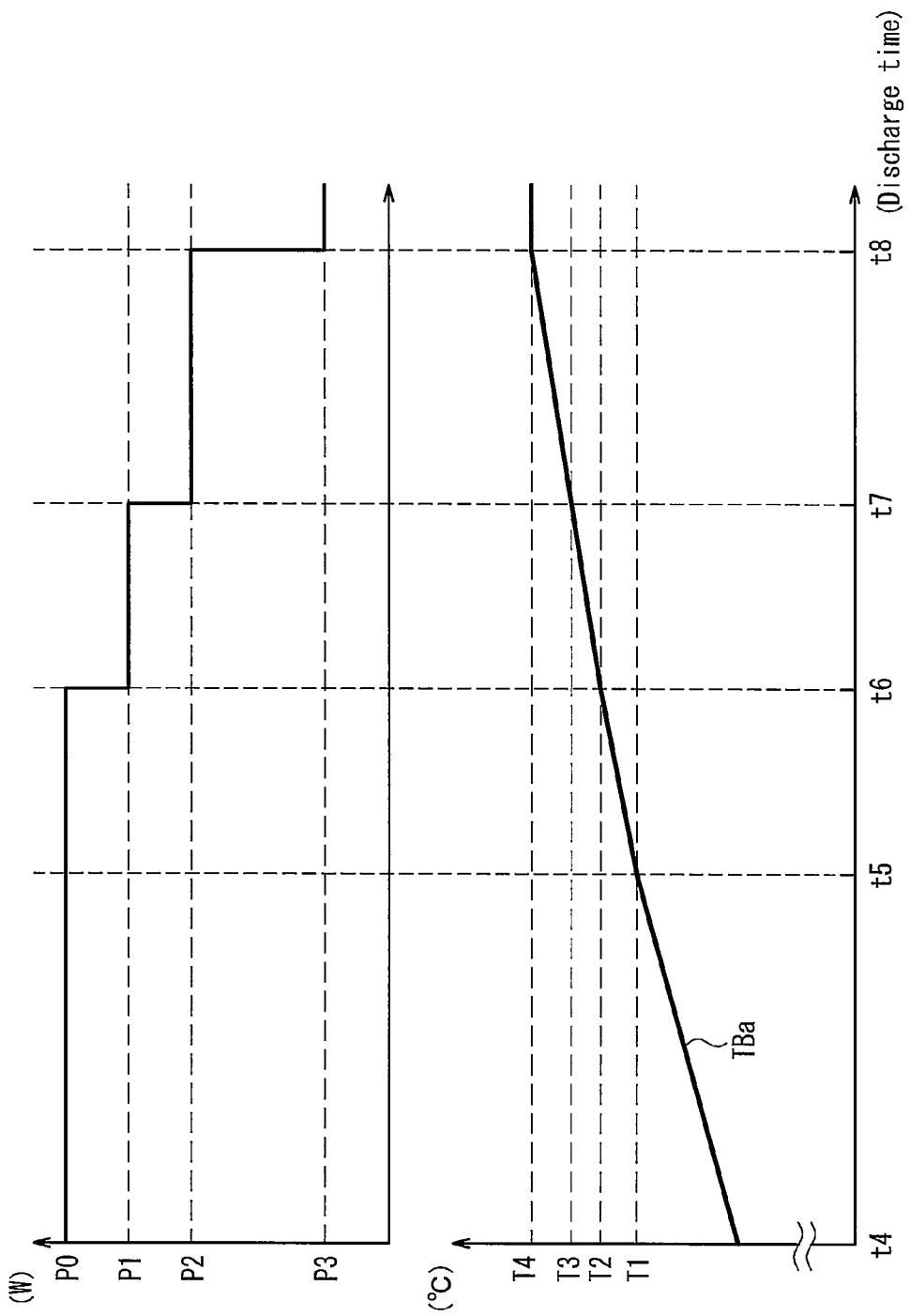
FIG. 5 is a diagram showing changes in both temperature of a secondary battery and power of a load in a power control mode of a secondary battery controller according to an embodiment.

FIG. 4 is a flow chart showing the control logic in the power control mode of the secondary battery controller in this embodiment. FIG. 5 shows the temperature of the battery A (3A) and the power value of the notebook computer (i.e., the load) when the secondary batteries are controlled based on the flow chart in FIG. 4. In FIG. 5, the upper graph shows the power value and the lower graph shows the battery temperature.

In the example of the control logic in the power control mode shown in FIG. 4, the start point is the step S110 in the control logic shown in FIG. 2. In this case, the temperature TBa of the battery A (3A) is the threshold temperature T1, as indicated by the time t5 of the lower graph in FIG. 5. At this time, the control portion 9 has not given instructions to the operating power control portion 12 to save the electric power yet. Therefore, the allowable power of the notebook computer remains at P0 from the beginning.

In the next step S201, the control portion 9 acquires the temperature information from the temperature detector 8A, and decides whether the temperature TBa of the battery A (3A) is not less than a first limit temperature T2. The first limit temperature T2 and a second limit temperature T3 (as will be described later) are higher than the threshold temperature T1 at which the batteries are switched in the battery switching mode, and lower than an upper limit temperature T4 of the battery. For example, in this embodiment, since T1 is 45° C. and T4 is 52° C., the first limit temperature T2 is set to 48° C. and the second limit temperature T3 is set to 50° C.

In the step S201, if the temperature TBa of the battery A (3A) is less than the first limit temperature T2 (i.e., in the case of "No"), then the control portion 9 decides whether the temperature of the battery B (3B) is not more than a temperature at which the battery B (3B) is available based on the temperature information from the temperature detector 8B (step S202).

The power control mode indicated by the control logic shown in FIG. 4 is a limited mode where the battery B (3B) is brought into the saturation state in which the battery temperature does not fall easily, and only the battery A (3A) can be used. Therefore, it is preferable that the control portion 9 always confirms the temperature of the battery B (3B), controls switching from the battery A (3A) to the battery B (3B) when the temperature of the battery B (3B) decreases to the temperature at which the battery B (3B) is available, and returns to the battery switching mode.

In the step S202, if the temperature of the battery B (3B) is not more than the temperature at which the battery B (3B) is available (i.e., in the case of "Yes"), then the control potion 9 proceeds to a step S215, returns to the step S107 of the battery switching mode shown in FIG. 2, and controls the switching device 10 to switch so that the output terminal of the battery B (3B) is connected to the DC/DC converter 11.

In the step S202, if the temperature of the battery B (3B) is more than the temperature at which the battery B (3B) is available (i.e., in the case of "No"), then the control portion 9 returns to the step S201.

On the other hand, in the step S201, if the temperature TBa of the battery A (3A) is not less than the first limit temperature T2 (i.e., in the case of "Yes"), then the control portion 9 transmits a signal to the operating power control portion 12, thereby giving instructions to limit the power consumption of the notebook computer to the power P1 that is lower than the normal power (rated power consumption) P0 (step S203). The step S203 corresponds to the time t6 in FIG. 5.

Subsequently, the control portion 9 confirms the temperature state of the battery B (3B) (step S204). In the step S204, if the battery B (3B) is available (i.e., in the case of "Yes"), then the control portion 9 proceeds to the step S215 and returns to the battery switching mode. If the battery B (3B) is not at the temperature at which the battery B (3B) is available (i.e., in the case of "No"), then the control portion 9 proceeds to a step S205.

In the step S205, the control portion 9 confirms whether the temperature TBa of the battery A (3A) is less than the first limit temperature T2. If the temperature TBa of the battery A (3A) is less than the first limit temperature T2 (i.e., in the case of "Yes"), then the control portion 9 gives instructions to the operating power control portion 12 to remove the power limitation and restore the power consumption to the power P0 (step S206), and returns to the step S201.

In the step S205, if the temperature TBa of the battery A (3A) is not less than the first limit temperature T2 (i.e., in the case of "No"), then the control portion 9 proceeds to a step S207 and confirms whether the temperature TBa of the battery A (3A) is not less than the second limit temperature T3.

In the step S207, if the temperature TBa of the battery A (3A) is less than the second limit temperature T3 (i.e., in the case of "No"), then the control portion 9 returns to the step S204.

On the other hand, in the step S207, if the temperature TBa of the battery A (3A) is not less than the second limit temperature T3 (i.e., in the case of "Yes"), then the control portion 9 proceeds to a step S208 and gives instructions to the operating power control portion 12 to perform operation at the power P2 that is lower than the power P1. The step S208 corresponds to the time t7 in FIG. 5.

Subsequently, the control portion 9 confirms the temperature state of the battery B (3B) (step S209). In the step S209, if the battery B (3B) is available (i.e., in the case of "Yes"), then the control portion 9 proceeds to the step S215 and returns to the battery switching mode. If the battery B (3B) is not at the temperature at which the battery B (3B) is available (i.e., in the case of "No"), then the control portion 9 proceeds to a step S210.

In the step S210, the control portion 9 confirms whether the temperature TBa of the battery A (3A) is less than the second limit temperature T3. If the temperature TBa of the battery A (3A) is less than the second limit temperature T3 (i.e., in the case of "Yes"), then the control portion 9 returns to the step S203 and gives instructions to the operating power control portion 12 to relax the power limitation on the load and restore the power consumption to the previous power P1.

On the other hand, in the step S210, if the temperature TBa of the battery A (3A) is not less than the second limit temperature T3 (i.e., in the case of "No"), then the control portion 9 proceeds to a step S211 and confirms whether the temperature TBa of the battery A (3A) is not less than the upper limit temperature T4.

In the step S211, if the temperature TBa of the battery A (3A) is less than the upper limit temperature T4 (i.e., in the case of "No"), then the control portion 9 returns to the step S209.

On the other hand, in the step S211, if the temperature TBa of the battery A (3A) is not less than the upper limit temperature T4 (i.e., in the case of "Yes"), then the control portion 9 proceeds to a step S212 and gives instructions to the operating power control portion 12 to transfer to a hardware (HW) limited mode. The hardware limited mode reduces the clock frequency of the notebook computer so as to minimize the power consumption. In the hardware limited mode, the electric power required for the operation of the notebook computer is reduced significantly. Therefore, the temperature of the battery A (3A) stops rising after the transfer to the hardware limited mode. In this case, the relationship between the battery temperature and the power consumption is shown at the time t8 in FIG. 5.

Subsequently, the control portion 9 proceeds to a step S213 and confirms the temperature state of the battery B (3B). In the step S213, if the battery B (3B) is available (i.e., in the case of "Yes"), then the control portion 9 proceeds to the step S215 and returns to the battery switching mode. If the battery B (3B) is not at the temperature at which the battery B (3B) is available (i.e., in the case of "No"), then the control portion 9 proceeds to a step S214.

In the step S214, the control portion 9 confirms whether the temperature TBa of the battery A (3A) is less than the upper limit temperature T4. If the temperature TBa of the battery A (3A) is less than the upper limit temperature T4 (i.e., in the case of "Yes"), then control portion 9 returns to the step S208 and gives instructions to the operating power control portion 12 to relax the power limitation on the load and restore the power consumption to the previous power P2.

On the other hand, in the step S214, if the temperature TBa of the battery A (3A) is not less than the upper limit temperature T4 (i.e., in the case of "No"), then the control portion 9 returns to the step S212 and continues the operation in the hardware limited mode (at the power P3).

As described above, according to the control logic in the power control mode, the power limitation on the notebook computer becomes stricter gradually so as to prevent the battery A (3A) from exceeding the upper limit temperature T4, while the control portion 9 always confirms the temperature of the battery B (3B) to examine the possibility of returning to the battery switching mode.

In the above description with reference to FIGS. 4 and 5, there are two stages (P1 and P2) of the power limitation before the transfer to the hardware limited mode (P3). However, the power limitation is not limited to two stages, and may be imposed in any number of stages as needed. In this embodiment, e.g., the value P1 of the power limitation in the first stage is 40 W and the value P2 of the power limitation in the second stage is 30 W.

When the operating power control portion 12 imposes the power limitation on the notebook computer, in order to prevent unstable operation of the notebook computer, the power of the notebook computer is reduced stepwise, e.g., by a decrement of 1 to 2 W rather than at once from P0 (normal power) to P1 (40 W) or from P1 to P2 (30 W), so that the power consumption can be limited to P1 and P2.

In this embodiment, the control logic of the control portion of the secondary battery controller has been described in two modes, i.e., the battery switching mode and the power control mode.

The control logic in this embodiment is used on the premise that both the battery A and the battery B maintain a sufficient charging voltage. During the battery operation in the battery switching mode, if the battery A or the battery B runs out of charging voltage and becomes unavailable, switching between the two batteries cannot be performed at this stage. Therefore, regardless of the temperatures of the battery A and the battery B, the other available battery is used for the control in the power control mode.

If the two batteries run out of charging voltage in the battery switching mode, and if the battery A runs out of charging voltage in the power control mode, a warning that the battery capacity is getting low and the notebook computer is about to stop working is issued in advance in the same manner as a general battery-operated electronic apparatus. Then, the operation of the notebook computer is finished so as to prevent breakage of the device such as a hard disk and data loss.

When there are three or more available batteries connected to the electronic apparatus, one of the batteries is selected as the battery A, and the other batteries are identified as the battery B, the battery C, the battery D, the battery E, etc. in sequence. If the battery A reaches the threshold temperature, it is switched to the battery B. Moreover, if the battery B reaches the threshold temperature, it is switched to the battery C. In this manner, the batteries are switched one after another and connected to the load.

After the transfer to the power control mode using the battery A, it is preferable that the control portion always confirms the temperatures of all the other batteries, selects any one of the batteries when the temperature of this battery is not more than the reference temperature, and returns to the battery switching mode.

The battery operation in the power control mode shown in FIGS. 4 and 5 can be applied independently of the battery switching mode to the whole electronic apparatus operated by the secondary battery (including the case where one battery is attached to the electronic apparatus).

Hereinafter, the configuration of the notebook computer as an example of the electronic apparatus in this embodiment will be described.

Figure 6:
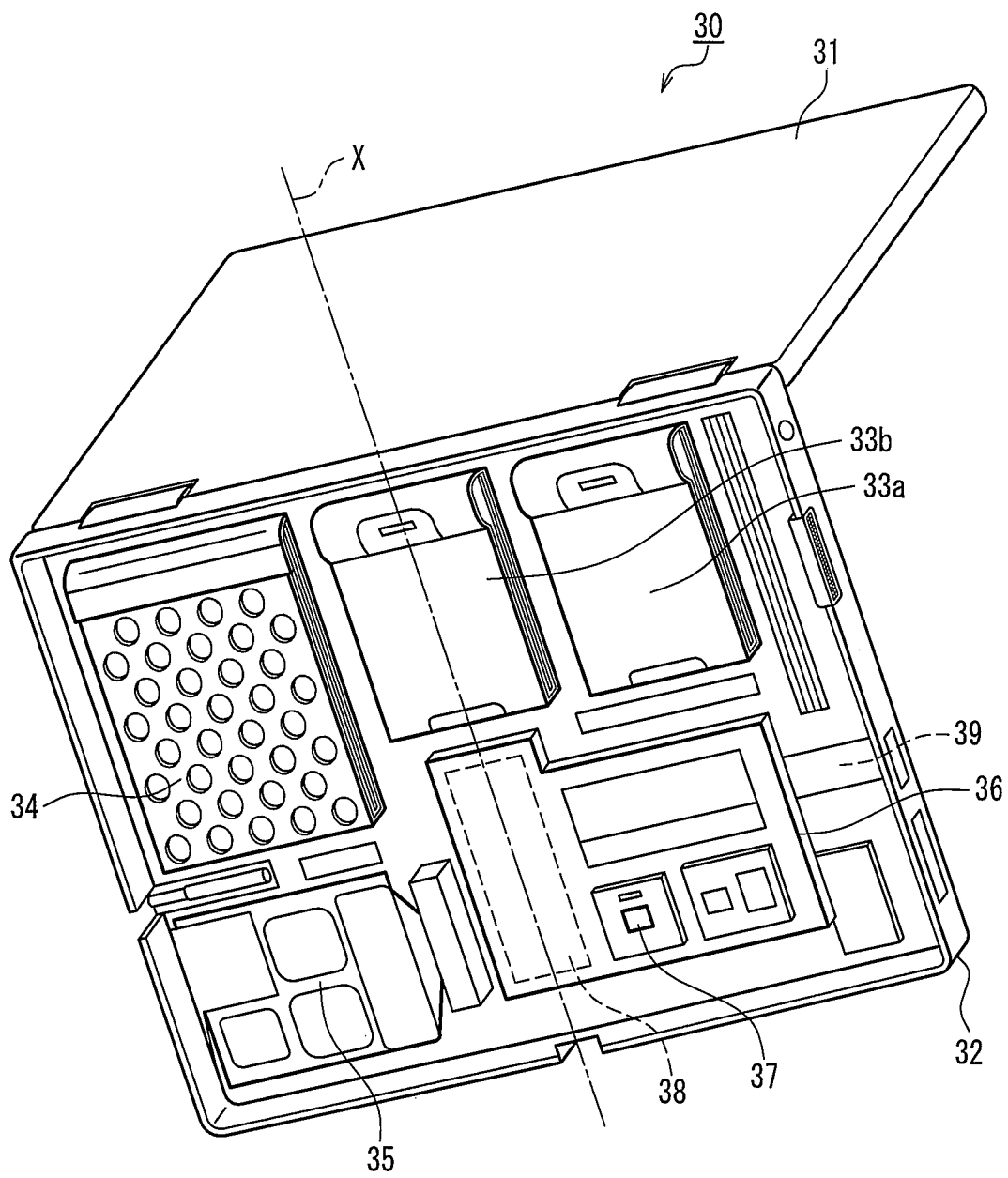
FIG. 6 is a diagram showing a configuration example of a notebook computer according to this embodiment.

FIG. 6 is a diagram showing the configuration of a notebook computer 30 (electronic apparatus) in this embodiment. For the sake of clear illustration of the battery arrangement in the notebook computer 30, FIG. 6 shows a main body 32 of the notebook computer 30 when it is viewed obliquely from the rear, and the base plate of the main body 32 is made transparent.

As shown in FIG. 6, the notebook computer 30 in this embodiment includes a cover 31 provided with a display device such as a liquid crystal panel and the main body 32 containing various electronic components. The cover 31 is attached rotatably to the main body 32. A keyboard, a power switch, an operating pad, etc. are provided on the upper surface of the main body 32.

In the main body 32, two batteries 33 (33a and 33b) are located near the back surface of the main body 32 to which the cover 31 is attached. The batteries 33a, 33b are attachable and detachable with respect to the main body 32. In the notebook computer 30 in this embodiment, the battery 33a is farther from a center line X of the main body 32, and therefore is considered to be closer to the outer surface of the notebook computer 30. Accordingly, the battery 33a is to be the battery A (first battery). On the other hand, the battery 33b is closer to the center (the center line X) of the main body 32, and therefore is to be the battery B (second battery).

The main body 32 includes various devices such as a hard disk drive (HDD) 34, a card slot 35 serving as an interface with a memory card or the like, and a circuit board 36 on which a central processing unit (CPU) 37 is mounted, in addition to the batteries 33. The secondary battery controller in this embodiment also constitutes, e.g., the electronic circuit on the circuit board 36.

In the main body 32 of the notebook computer 30 in this embodiment, a circuit component such as a power circuit that generates heat during operation of the notebook computer 30 is disposed in a portion 38 of the circuit board 36, which is surrounded by a dotted line and near the center of the main body 32 in FIG. 6. Moreover, a fan 39 is provided for heat dissipation in the main body 32. Therefore, it is evident that the battery 33a is located farther from the CPU 37 and the portion 38 of the circuit board 36 (i.e., the source of heat generation) and closer to the fan 39 (i.e., the heat dissipating member) than the battery 33b. Thus, comparing the two batteries 33a, 33b, the battery 33a is maintained at a lower temperature. In this regard, the battery 33a is more suitable to be designated as the battery A (first battery) in the control of these secondary batteries.

The notebook computer 30 may have a configuration other than that shown in FIG. 6 as a general configuration of the notebook computer. For example, in addition to the components shown in FIG. 6, the notebook computer 30 may include various members such as a DVD/CD disk drive and an antenna module for connection with wireless LAN as needed.

Figure 7:
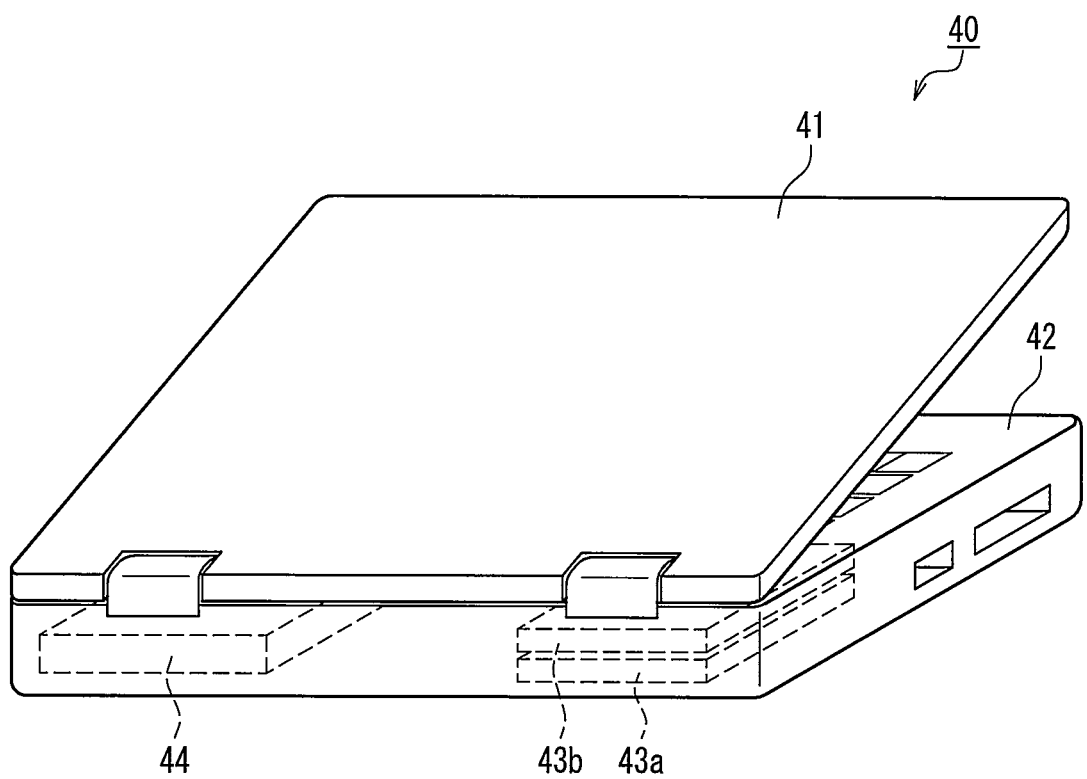
FIG. 7 is a diagram showing another configuration example of a notebook computer according to this embodiment.
Figure 8:
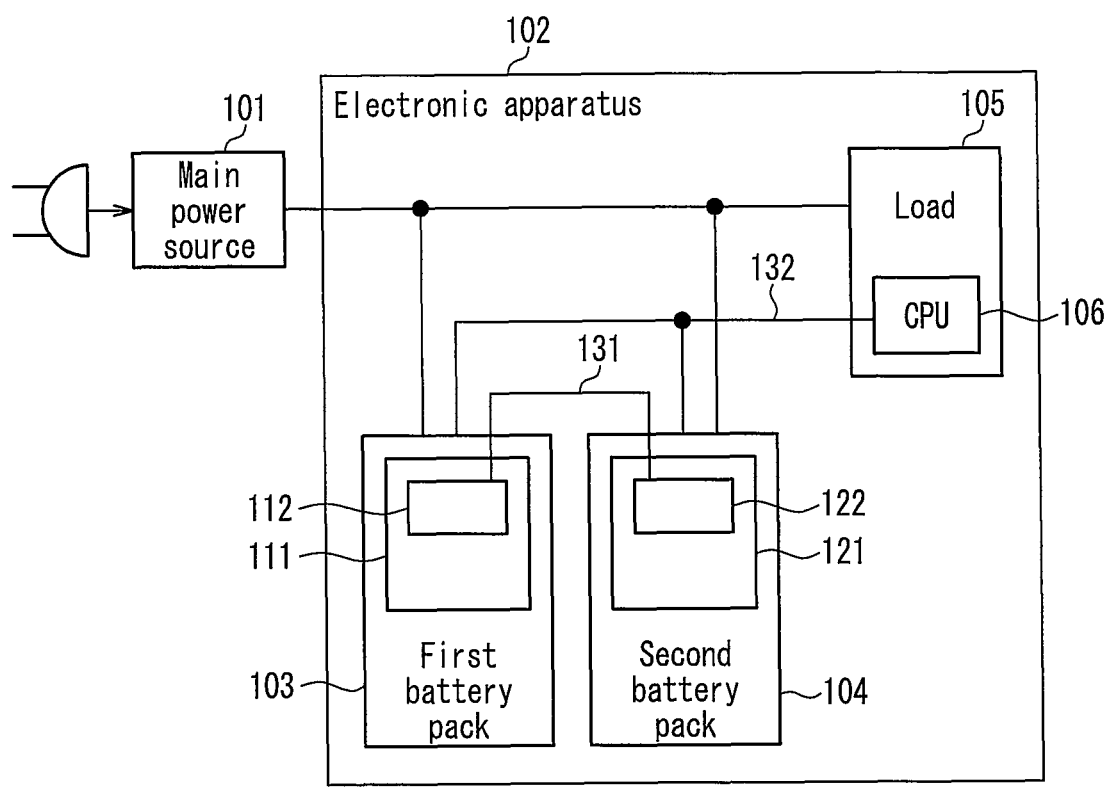
FIG. 8 is a circuit block diagram showing a configuration of a conventional secondary battery controller.

FIG. 7 is a diagram showing another configuration example of a notebook computer in this embodiment. For the sake of clear illustration of the battery arrangement in a notebook computer 40, FIG. 7 shows the notebook computer 40 when it is viewed from the back surface.

As shown in FIG. 7, the notebook computer 40 includes a cover 41 that is attached rotatably to a main body 42. Two batteries 43 (43a and 43b) are located near the back surface of the main body 42. The batteries 43a, 43b are attachable and detachable with respect to the main body 42. The notebook computer 40 (the second configuration example) differs from the notebook computer 30 in that the two batteries 43 are arranged on top of one another in the thickness direction of the main body 42, while the two batteries 33 are arranged side by side in the notebook computer 30 in FIG. 6. The notebook computer 40 (the second configuration example) also can have the known configuration of a conventional notebook computer, and therefore the detailed description and representation of various members of the notebook computer 40 will be omitted.

In the notebook computer 40 shown in FIG. 7, the battery 43a and the battery 43b are spaced at the same distance from the other component 44 in the main body 42. However, in view of the thickness direction of the notebook computer 40, the battery 43*a*, which is located under the battery 43*b* in FIG. 7, is closer to the surface of the case of the notebook computer 40 than the battery 43*b*. Therefore, the battery 43*a* is considered to be closer to the outer surface of the notebook computer 40. Thus, as shown in FIG. 7, when two batteries are arranged on top of one another, the lower battery that is closer to the surface of the case preferably is used as the battery A (first battery) in the method for controlling a secondary battery in this embodiment.

In the above embodiment, the secondary battery controller and the method for controlling a secondary battery have been described when the notebook computer (electronic apparatus) is operated by the lithium ion battery. However, the secondary battery controller and the method for controlling a secondary battery of the present invention are not limited to the notebook computer, and can be applied to various electronic apparatuses including portable equipment, such as a portable telephone, a portable game machine, a small television receiver, a Blu-ray display, and a navigation system, as long as they are operated by the secondary battery.

In addition to the lithium ion battery as described above, various chargeable and dischargeable secondary batteries such as a nickel-cadmium (NiCad) battery and a lithium ion polymer battery can be used.

The secondary battery controller, the method for controlling a secondary battery, and the electronic apparatus of the present invention can achieve high efficiency of the secondary battery used as a power source of various electronic apparatuses including mobile equipment, and can be applied to a wide range of uses.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A secondary battery controller for controlling a plurality of batteries of an electronic apparatus, comprising:

a plurality of temperature detectors that detect temperatures of the plurality of batteries;

a switching device that connects to an output of any one of the plurality of batteries to a load;

a control portion that selects one of the plurality of batteries for use, and controls the switching device to switch connection of the load to the one of the plurality of batteries based on temperature information of each of the plurality of batteries obtained by the temperature detectors; and an operating power control portion that limits an operation of the load, wherein the control portion controls the switching device to connect a first selected battery to the load to operate at a first operating power, and when the first selected battery reaches a first threshold temperature, the control portion controls the switching device to connect another one of the plurality of batteries in sequence to the load, and then when the last selected battery reaches the first threshold temperature after all the plurality of batteries have been selected to being connected to the load in sequence, the control portion controls the switching device to reconnect the first selected battery to the load, wherein when the first selected battery is reconnected to the load and the temperature of the first selected battery is not less than the first threshold temperature and is less than a second threshold temperature that is higher than the first threshold temperature, the control portion controls the operating power control portion to limit operating power of the load to a second operating power that is less than the first operating power, and then when the first selected battery reaches the second threshold temperature, the control portion controls the switching device to connect another one of the plurality of batteries in sequence to the load, and then when the last selected battery reaches the second threshold temperature after all the plurality of batteries have been selected in sequence, the control portion controls the switching device to reconnect the first selected battery to the load, wherein when the first selected battery is reconnected to the load and the temperature of the first selected battery is not less than the second threshold temperature and is less than a third threshold temperature that is higher than the second threshold temperature, the control portion controls the operating power control portion to limit operating power of the load to a third operating power that is less than the second operating power, and then when the first selected battery reaches the third threshold temperature, the control portion controls the switching device to connect another one of the plurality of batteries in sequence to the load, wherein the operating power of the load is limited by the operating power control portion only when the temperatures of all of the plurality of batteries are not less than the first threshold temperature, and when one of the plurality of batteries has a temperature which is not more than the first threshold temperature, the control portion does not allow the operating power control portion to limit the operating power of the load.

2. The secondary battery controller according to claim 1, wherein when the first selected battery reaches a predetermined upper limit temperature even after the operation of the load is limited, the control portion controls the operation of the load under a minimum load.

3. The secondary battery controller according to claim 1, wherein when the temperature of any one of the plurality of batteries other than the first selected battery is not more than the first threshold temperature while the operation of the load is limited or controlled under a minimum load, the control portion controls the switching device to connect the load to the one of the plurality of batteries having the temperature that is not more than the first threshold temperature, and the control portion controls the operating power control portion to remove the limitation of the operation of the load.

4. A method for controlling plurality of batteries connected to a load of an electronic apparatus, the method comprising:

detecting temperatures of the plurality of batteries;

connecting a first selected battery of the plurality of batteries to the load, and setting an operating power of the load at a first operating power;

disconnecting the first selected battery from the load, and connecting another one of the plurality of batteries in sequence to the load when the temperature of the first selected battery is greater than or equal to a first threshold temperature;

disconnecting the last selected battery from the load and reconnecting the first selected battery to the load when the temperature of the last selected battery is greater than or equal to the first threshold temperature, and limiting the operating power of the load to a second operating power that is less than the first operating power;

disconnecting the first selected battery from the load, and connecting the another one of the plurality of batteries in sequence to the load when the temperature of the first selected battery is greater than or equal to a second threshold temperature;

disconnecting the last selected battery from the load and reconnecting the first selected battery to the load when the temperature of the last selected battery is greater than or equal to the second threshold temperature, and limiting the operating power of the load to a third operating power that is less than the second operating power;

limiting the operating power of the load only when the temperatures of all of the plurality of batteries are greater than or equal to the first threshold temperature; and not limiting the operating power of the load when at least one of the plurality of batteries has a temperature which is less than the first threshold temperature.

5. The method according to claim 4, further comprising:
limiting the operating power of the load to a minimum power when the first selected battery reaches a predetermined upper limit temperature even after the operating power of the load is limited.

6. The method according to claim 4, further comprising:
when the temperature of any one of the batteries other than the first selected battery is not more than the first threshold temperature while the operation of the load is limited or controlled under a minimum load, connecting the load to the one of the batteries that has the temperature of not more than the first threshold temperature;
removing the limitation on the operating power of the load.

7. An electronic apparatus, comprising:
a load;
a plurality of batteries that serve as operating power sources of the load; and
the secondary battery controller according to claim 1 for switching the connection of the plurality of batteries to the load.

* * * * *